United States Patent

Mosko (10) Patent No.: US 9,276,922 B2
(45) Date of Patent: Mar. 1, 2016

(54) BORDER PROPERTY VALIDATION FOR NAMED DATA NETWORKS (71) Applicant: Palo Alto Research Center Incorporated, Palo Alto, CA (US)

(72) Inventor: Marc E. Mosko, Santa Cruz, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 0 days.

(21) Appl. No.: 14/284,252

(22) Filed: May 21, 2014

(65) Prior Publication Data

US 2015/0341329 A1 Nov. 26, 2015

(51) Int. Cl.
*G06F 7/04* (2006.01)
*H04L 29/06* (2006.01)
*H04L 29/08* (2006.01)

(52) U.S. Cl.
CPC ............... *H04L 63/08* (2013.01); *H04L 63/04* (2013.01); *H04L 67/327* (2013.01)

(58) Field of Classification Search
CPC ........ H04L 63/08; H04L 67/327; H04L 63/04
See application file for complete search history.

(56) References Cited

U.S. PATENT DOCUMENTS

2007/0162394 A1* 7/2007 Zager et al. ............. 705/51
2009/0285209 A1* 11/2009 Stewart et al. ............. 370/389
2010/0100465 A1* 4/2010 Cooke et al. ............. 705/34
2013/0074155 A1* 3/2013 Huh et al. ............. 726/3
2013/0166668 A1* 6/2013 Byun et al. ............. 709/207
2014/0149733 A1* 5/2014 Kim ............. 713/153

OTHER PUBLICATIONS

Jacobson. V., Smetters. D.K., Thornton. J. D., Plass. M.F., Briggs. N.H., and Braynard. R.L. "Networking Named Content," CoNEXT'09, Dec. 2009 (hereinafter "Jacobson") (attached to the instant office action as Jacobson_2009.pdf).*

* cited by examiner

*Primary Examiner* — Techane Gergiso
(74) *Attorney, Agent, or Firm* — Shun Yao; Park, Vaughan, Fleming & Dowler LLP (57) ABSTRACT One embodiment provides a system for distributing packets within a trust domain. During operation, the system receives, by an ingress node in the trust domain, a message. The system creates a property vector for the message, where the property vector indicates a number of properties that have been determined for the message. The system generates a first authenticator for the message based on the property vector and a secret key shared by a plurality of nodes in the trust domain. The system transmits the message, the property vector, and the first authenticator to another node in the trust domain, thereby facilitating secure and efficient distribution of messages within the trust domain without requiring intermediate nodes to determine the properties indicated in the property vector.

24 Claims, 10 Drawing Sheets

| TYPE 702 | LENGTH 704 | VALUE 706 |
|---|---|---|
| PRIORITY 702.1 | 704.1 | Silver 706.1 |
| SIM_HASH 702.2 | 704.2 | H{Name + other fields} 706.2 |
| EGR_POLICY 702.3 | 704.3 | Authenticate VLAN identifier 706.3 |
| ... | ... | ... |
| AUTHENTICATOR 702.n | 704.n | HMAC$_1$ 706.n |

FIG. 7A

| TYPE 752 | LENGTH 754 | VALUE 756 |
|---|---|---|
| VERIFY_SIG 752.1 | 754.1 | Yes 756.1 |
| HASH_CO 752.2 | 754.2 | H{Content Object} 756.2 |
| HASH_PUB_KEY 752.3 | 754.3 | H{Public Key of Content Object} 756.3 |
| MPLS_LABEL 752.4 | 754.4 | Label$_1$ 756.4 |
| EGR_POLICY 752.5 | 754.5 | Authenticate VLAN identifier 756.5 |
| ... | ... | ... |
| AUTHENTICATOR 752.n | 754.n | HMAC$_2$ 756.n |

BORDER PROPERTY VALIDATION FOR NAMED DATA NETWORKS

BACKGROUND

1. Field

This disclosure is generally related to the distribution of digital content. More specifically, this disclosure is related to pre-calculating and verifying properties of a message in a named data network, and delegating the burden of this property validation to border routers within a trust domain.

2. Related Art

The proliferation of the Internet and e-commerce continues to fuel revolutionary changes in the network industry. Today, a significant number of information exchanges, from online movie viewing to daily news delivery, retail sales, and instant messaging, are conducted online. An increasing number of Internet applications are also becoming mobile. However, the current Internet operates on a largely location-based addressing scheme. The two most ubiquitous protocols, the Internet Protocol (IP) and Ethernet protocol, are both based on location-based addresses. That is, a consumer of content can only receive the content by explicitly requesting the content from an address (e.g., IP address or Ethernet media access control (MAC) address) closely associated with a physical object or location. This restrictive addressing scheme is becoming progressively inadequate for meeting the ever-changing network demands.

Recently, content centric network (CCN) and named data network (NDN) architectures have been proposed in the industry. CCN brings a new approach to content transport. Instead of having network traffic viewed at the application level as end-to-end conversations over which content travels, content is requested or returned based on its unique name, and the network is responsible for routing content from the provider to the consumer. Note that content includes data that can be transported in the communication system, including any form of data such as text, images, video, and/or audio. A consumer and a provider can be a person at a computer or an automated process inside or outside the CCN. A piece of content can refer to the entire content or a respective portion of the content. For example, a newspaper article might be represented by multiple pieces of content embodied as data packets. A piece of content can be associated with meta-data describing or augmenting the piece of content with information such as authentication data, creation date, content owner, etc.

In a CCN or NDN, content objects and interests are identified by their names, which are typically hierarchically structured variable-length identifiers (HSVLI). Generally, interests and content objects travel through a number of links before they can reach their destination. In CCN, specialized hardware might be required to calculate and verify certain properties potentially at line rate. These operations include, but are not limited to, a hash of a content object, signature verification when an embedded key is present, a hash of an interest, and other properties that can communicate state information within a trust domain. While some routers (such as border routers) in a CCN trust domain are designed for these computationally expensive line rate calculations, other routers (such as backbone core routers) in the same domain could experience significant delay if required to calculate and verify these various properties.

SUMMARY

One embodiment provides a system for distributing packets within a trust domain. During operation, the system receives, by an ingress node in the trust domain, a message. The system creates a property vector for the message, where the property vector indicates a number of properties that have been determined for the message. The system generates a first authenticator for the message based on the property vector and a secret key shared by a plurality of nodes in the trust domain. The system transmits the message, the property vector, and the first authenticator to another node in the trust domain, thereby facilitating secure and efficient distribution of messages within the trust domain without requiring intermediate nodes to determine the properties indicated in the property vector.

In some embodiments, the message is an interest in a piece of content, and the property vector includes a similarity hash value of the interest based on a name of the interest and one or more fields of the interest.

In some embodiments, the message is a content object, and the property vector includes one or more of: a hash value of the content object; a hash value of a public key associated with the content object; and an indication of whether a digital signature of a sender of the message has been verified.

In some embodiments, the property vector indicates one or more of: a scheduling priority of the message; information related to billing; information related to quality of service; information relating to auditing; and a path-switching label.

In some embodiments, the property vector comprises an egress policy of the message, which specifies operations to perform upon departure of the message from the trust domain.

In some embodiments, the system removes, by an egress node in the trust domain, the property vector associated with the message upon departure of the message from the trust domain.

In some embodiments, the system receives, by a node in the trust domain other than the ingress node, the message, the property vector, and the first authenticator for the message. The system generates a second authenticator for the message based on the shared secret key and the property vector. Responsive to determining that the first authenticator is the same as the second authenticator, the system authenticates the message.

In some embodiments, the system performs one or more of: modifying the property vector for the message; and creating an additional property vector for the message. The system generates a third authenticator for the message based on the shared secret key and one or more of the modified property vector and the additional property vector for the message. The system forwards the message, one or more of the modified property vector and the additional property vector, and the third authenticator to another node in the trust domain.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a computer network environment for efficiently distributing packets within a trust domain by pre-calculating and verifying various properties upon ingress into the trust domain, and including a proof within the message such that intermediate routers in the trust domain do not need to repeat the validation procedures. The computer network environment can include a content-centric network (CCN) and a named-data network (NDN). In CCN and NDN, interests and content objects are identified by their names, which are typically hierarchically structured variable-length identifiers (HSVLI). Generally, interests and content objects travel through a number of links before they can reach their destination. The network devices that couple these links are referred to and used interchangeably herein as routers, devices, nodes, and routers or devices at a node.

Upon receiving a message, a border router at an ingress node within a trust domain performs property validation, which can include pre-calculation and verification of various properties, such as computationally expensive verification of the digital signature of the sender. Property validation for an interest can include: calculating a similarity hash value of the interest based on a name of the interest and one or more fields of the interest; and verifying a property related to the state of the message, including scheduling priorities, egress policies, billing, auditing, quality of service, and path switching labels. Property validation for a content object can include: verifying a digital signature of a sender of the message; calculating a hash value of the content object; calculating a hash value of a public key associated with the content object; and verifying properties related to the state of the message, as for the interest message described above.

The border router then creates a property vector for the message, which can be a single serialized vector such as a set of Type Length Value (TLV) fields. Each entry in the property vector represents a validated property. For example, one entry can include the hash value of the requested content object. Another exemplar entry can include a signature field with a Boolean value that indicates whether the digital signature of the sender has been verified. If a content object includes a public key in the object, the border router can calculate a hash value of the public key and determine whether the key matches a stated KeyId field. If there is no match, the border router can drop the packet. If there is a match, the border router can indicate the results in the signature field. If a content object includes a public key certificate, the border router can validate properties of the certificate, such as expiration and revocation.

The border router then generates an authenticator based on the property vector, using a secure mechanism such as a symmetric key signature. The authenticator can include the identity of the border router, the key being used, and replay prevention such as a sequence number. In some embodiments, the shared secret key is distributed to a number of intermediate nodes by a trusted central key distribution authority. In further embodiments, the nodes can use a peer-to-peer secret key exchange protocol to share a secret key. The authenticator authenticates the property vector for the message. In some embodiments, the authenticator is a hash of the property vector based on a secret cryptographic key (e.g., the shared secret key). The shared secret key can be included in the header of the packet, as in the Password Authentication Protocol (PAP). In some embodiments, the system can perform an Exclusive Or (XOR) operation on the property vector and the shared secret key. The system can also use the shared secret key in an XOR-based hash mechanism (e.g., shift-add-xor or Fowler/Noll/Vo (FNV)). However, for some validated properties such as the hash of the content object, which any observer may calculate, using an XOR approach may leak the shared secret key. Because many of the properties are either globally calculable or result in only a limited set of outcomes, mechanisms such as PAP or XOR could be less secure against eavesdroppers.

In some embodiments, the authenticator includes a summary of the message body, such as the digest of the message. This is to prevent an insider attack where the authenticator from one packet is put on a different packet, and its use depends on the trust model within the domain.

In some embodiments, the border router appends the authenticator to the property vector. The border router transmits the message, the property vector, and the authenticator to an intermediate router in the trust domain.

Upon receiving the message, the intermediate router authenticates the message by generating its own authenticator based on the property vector and the shared secret key. The intermediate router determines if its own generated authenticator is the same as the received one. If they are not the same, the intermediate router can drop the packet and send feedback to the sending node. If they are the same, the intermediate router forwards the message, property vector, and received authenticator to another node in the trust domain. Thus, the intermediate router need only authenticate the already created and signed property vector, which may be a fast hash operation, and does not need to perform any expensive calculations or verifications. This mechanism facilitates efficient and secure distribution of messages within the trust domain.

In some embodiments, if the intermediate router's own generated authenticator is the same as the received authenticator, the intermediate router can modify the property vector and/or create an additional property for the message. The intermediate router then generates a third authenticator based on the modified property vector and the secret key, and transmits the message, the modified property vector, and the third authenticator to another node. For example, if the intermediate router experiences congestion, it can add an entry in the property vector that notes the congestion with an indication to back off. In another example, if the property vector includes a virtual local area network (VLAN) label and an indication that the label must be swapped at the intermediate router, then the intermediate router can modify the property vector accordingly for the respective entry.

Upon ingress to or egress from the trust domain, the system removes any existing pre-calculated properties or verification indicators. In some embodiments, the system removes the property vector upon egress from the trust domain. A property vector can contain an entry corresponding to an egress policy, which can be a statement in a policy language or a policy index known throughout the trust domain via a policy dissemination protocol. A border router at an egress node can perform the specified egress policy operations upon departure of the message from the trust domain. For example, in a virtual private network (VPN) or a VLAN, an inbound interest may only be satisfied by a content object on the same VPN or VLAN. This property can be accounted for by including a VPN or VLAN identifier in the property vector. The VPN or VLAN identifier is thus asserted by one device upon ingress and enforced by another device upon egress.

In some embodiments, an ingress device can determine, based on routing or other knowledge, that a specific message should follow a well-known switched path, such as in Multi-Protocol Label Switching (MPLS), where data packets are each assigned labels and packet-forwarding decisions are made solely based on the contents of the label, thus obviating the need to examine the packet itself. As with the VPN or VLAN identifier, this MPLS path identifier can be included in the signed property vector. Other examples of property vector entries include various properties discussed herein, such as information relating to scheduling priorities, billing, auditing, and quality of service.

The following terms describe elements of an NDN or CCN architecture:

Content Object:

A piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names:

A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ndn, and test.txt can be structured in a left-oriented prefix-major fashion to form the name "/parc/home/ndn/test.txt." Thus, the name "/parc/home/ndn" can be a "parent" or "prefix" of "/parc/home/ndn/test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814 (entitled "ORDERED-ELEMENT NAMING FOR NAME-BASED PACKET FORWARDING," by inventor Ignacio Solis, filed 20 Mar. 2013), which is hereby incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest:

A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

The methods disclosed herein are not limited to CCN networks and are applicable to other architectures as well. A description of a CCN architecture is described in U.S. patent application Ser. No. 12/338,175 (entitled "CONTROLLING THE SPREAD OF INTERESTS AND CONTENT IN A CONTENT CENTRIC NETWORK," by inventors Van L. Jacobson and Diana K. Smetters, filed 18 Dec. 2008), which is hereby incorporated by reference.

Exemplary Network and Communication

Figure 1:
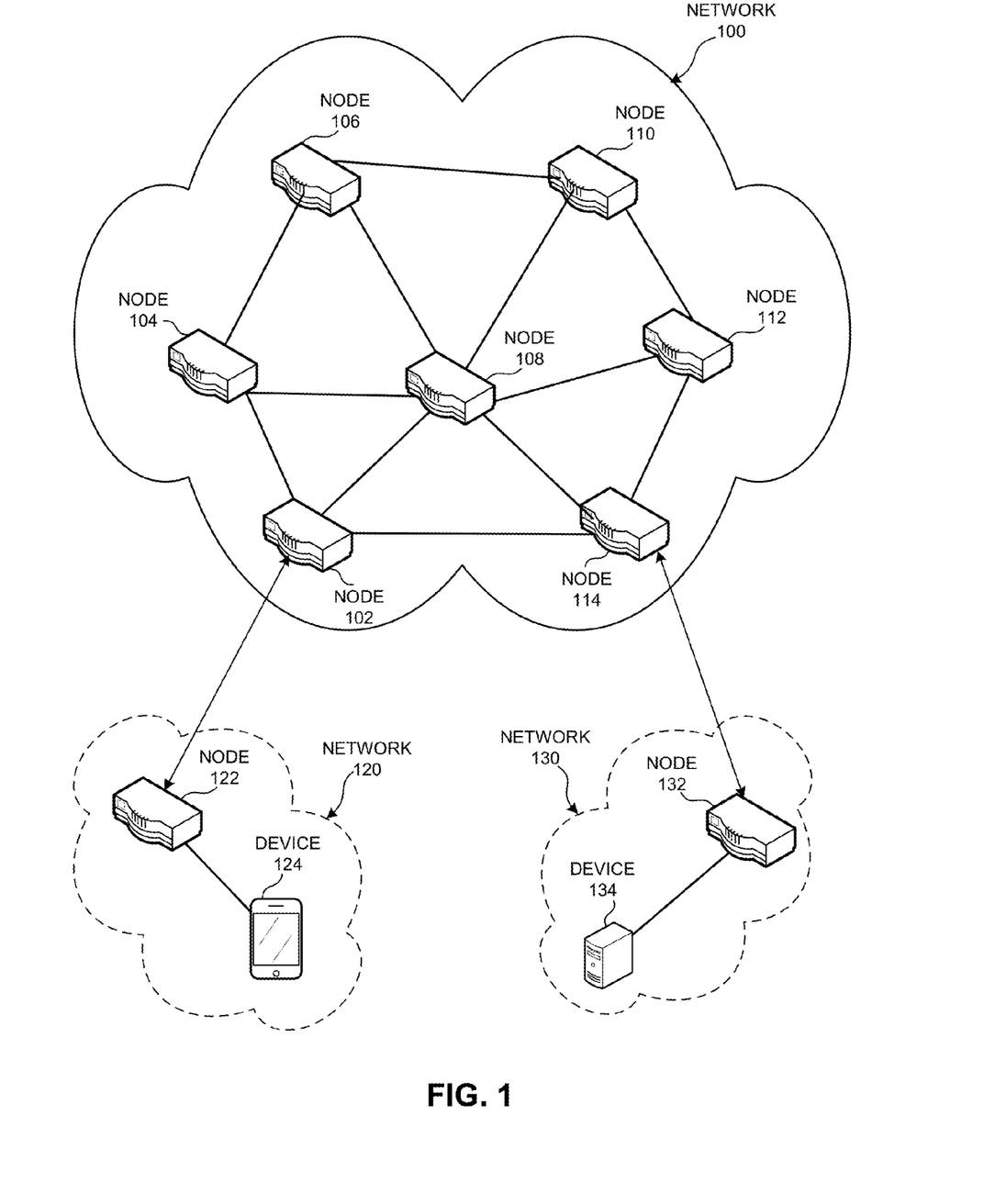
FIG. 1 illustrates an exemplary network that facilitates distribution of packets within a trust domain by using property validation at the border routers, in accordance with an embodiment of the present invention.

FIG. 1 illustrates an exemplary network that facilitates distribution of packets within a trust domain by using property validation at the border routers, in accordance with an embodiment of the present invention. Network 100 can include nodes 102, 104, 106, 108, 110, 112, and 114. Network 100 can be a trust domain comprised of nodes 102-114. Each of nodes 102-114 can be connected to other nodes in other networks. For example, node 102 can be an edge or border router connected to network 120, which includes node 122 and device 124. Node 114 in network 100 can be an edge or border router connected to network 130, which includes node 132 and device 134. Nodes 102 and 114 can each be an ingress node or an egress node, depending on the direction of the flow of data. Nodes 104-112 can be intermediate or core routers within the same trust domain of network 100.

For example, a user of device 124 can generate an interest in a piece of content, which passes through node 122 in network 120. Border router 102 in network 100 receives the interest (hence acting as an ingress node), performs various validations (including verification of the digital signature of the sender and pre-calculation of message properties), creates a property vector indicating the validations, generates an authenticator based on a shared secret key, and transmits the message with the property vector and authenticator to node 108. Intermediate router 108 receives the message and in turn generates its own authenticator.

Intermediate router 108 then determines whether its own generated authenticator matches the received authenticator, and if so, transmits the message, property vector, and its authenticator to border router 114. Border router 114 authenticates the message in the same manner as intermediate router 108, executes any egress policies specified in the property vector, and removes the property vector from the message before forwarding the message out of the trust domain to network 130 (hence acting as an egress node).

Node 132 in network 130 receives the message and passes it to a content producer device 134, which contains the requested content and passes the content object back along the same reverse path as the interest (e.g., border router 114 to intermediate router 108 to border router 102). As the data passes back through network 100, border router 114 performs the role of an ingress node, while border router 102 performs the role of an egress node. In this manner, content flows efficiently through the trust domain of network 100 without requiring an intermediate node to perform additional verifications or calculations.

Figure 2A:
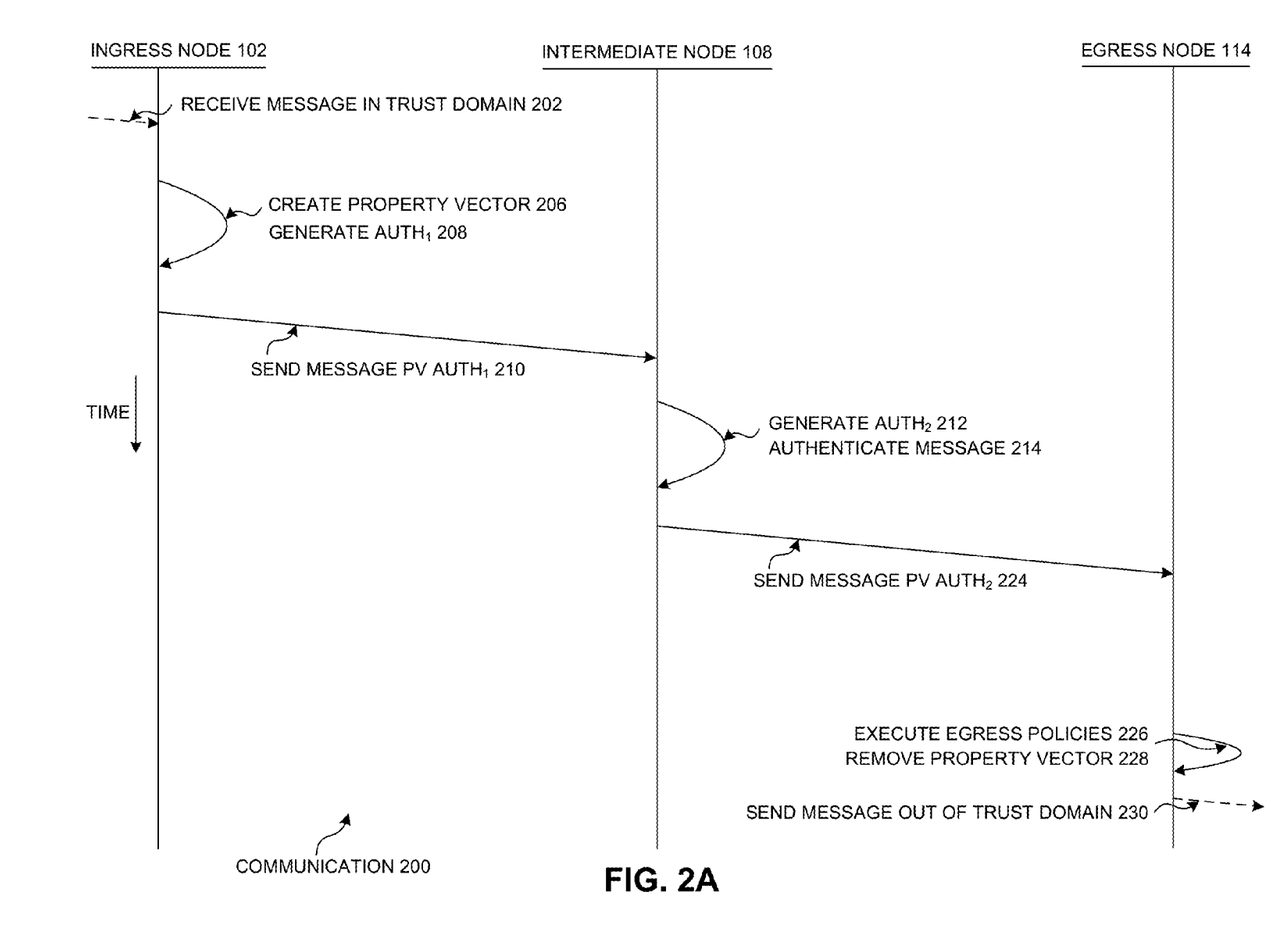
FIG. 2A illustrates exemplary communication between an ingress node, an intermediate node, and an egress node within a trust domain, in accordance with an embodiment of the present invention.

FIG. 2A illustrates exemplary communication 200 between an ingress node 102, an intermediate node 108, and an egress node 114 within a trust domain, in accordance with an embodiment of the present invention. The vertical lines beneath ingress node 102, intermediate node 108, and egress node 114 indicate passage of time. Ingress node 102, intermediate node 108, and egress node 114 share a secret key. Ingress node 102 receives a message in the trust domain (operation 202). Ingress node 102 creates a property vector for the message that indicates various properties that have been determined for the message (operation 206). For a message that corresponds to an interest in a piece of content, creating the property vector can include: calculating a similarity hash value of the interest based on a name of the interest and one or more fields of the interest; and verifying a property related to the state of the message, including scheduling priorities, egress policies, billing, auditing, quality of service, and path switching labels. For a message that corresponds to a content object, creating the property vector can include: verifying a digital signature of a sender of the message; calculating a hash value of the content object; calculating a hash value of a public key associated with the content object; and verifying similar properties related to state, as described above for a message corresponding to an interest.

Next, ingress node 102 generates an authenticator (denoted as $AUTH_1$) for the message based on the shared secret key and the property vector (operation 208). In some embodiments, the authenticator is a hash based message authentication code (HMAC). Ingress node 102 then transmits the message, property vector, and $AUTH_1$ to intermediate node 108 (operation 210).

Figure 2B:
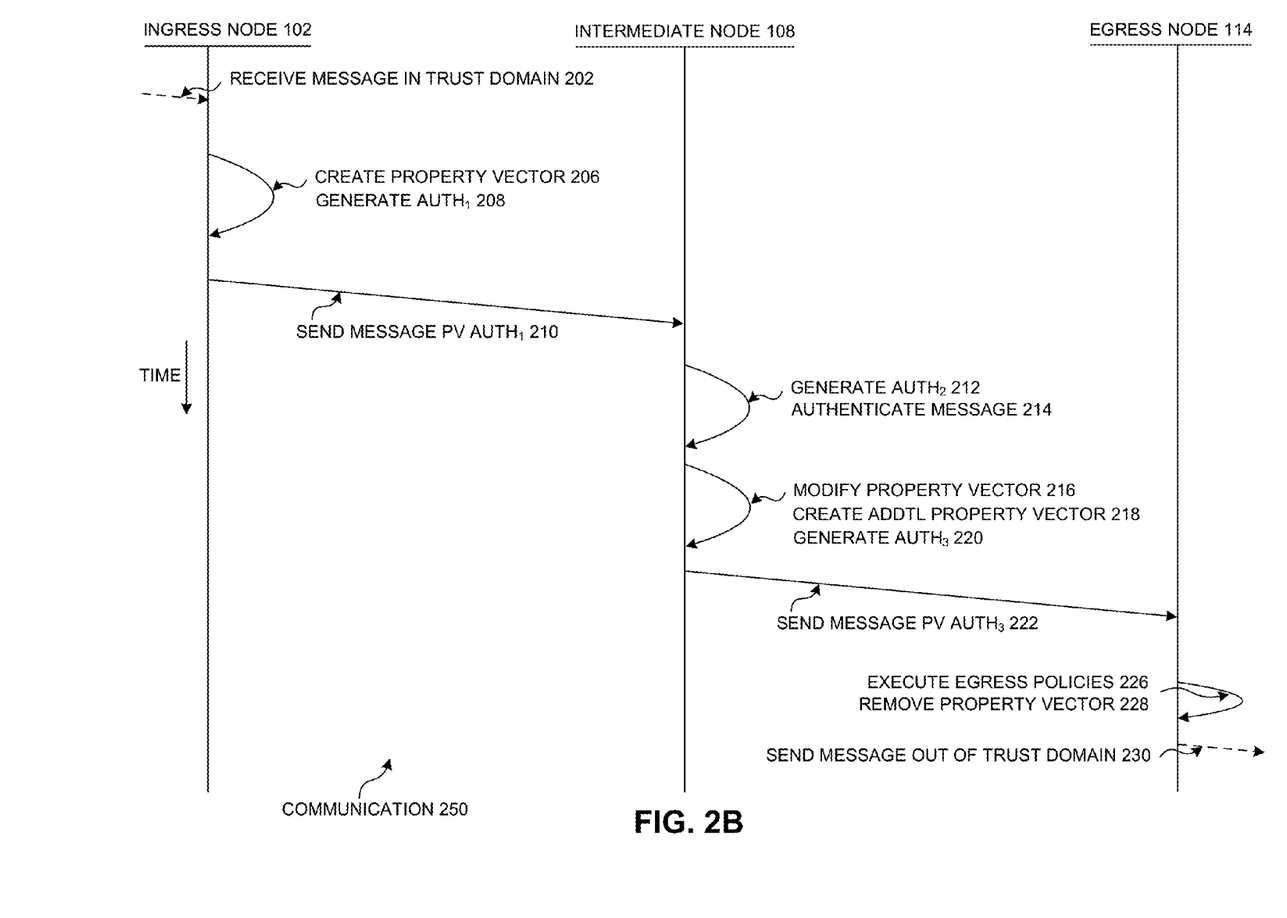
FIG. 2B illustrates exemplary communication between an ingress node, an intermediate node, and an egress node within a trust domain, in accordance with an embodiment of the present invention.

Intermediate node 108 receives the message, property vector, and $AUTH_1$ and generates an authenticator (denoted as $AUTH_2$) for the message based on the shared secret key and the property vector (operation 212). Intermediate node 108 then authenticates the message to determine whether $AUTH_2$ is the same as $AUTH_1$ (operation 214). If they are not the same, intermediate node 108 can drop the packet and send feedback to the sending node. If they are the same, intermediate node 108 transmits the message, property vector, and $AUTH_2$ to egress node 114 (operation 224). Note that the authenticator transmitted in operation 224 can be either of $AUTH_1$ or $AUTH_2$, as operation 224 only occurs upon determining that they are the same. Alternatively, if $AUTH_1$ matches $AUTH_2$, intermediate node 108 can perform the procedures 216, 218, 220, 222, 226, 228, and 230 as depicted in FIG. 2B and described below. Note that intermediate node 108 does not need to verify the digital signature or perform the same validations performed by ingress node 102.

Egress node 114 receives the message, property vector, and $AUTH_2$. Egress node generates an authenticator and authenticates the message (as described above for intermediate node 108), and then executes any egress policies included in the property vector (operation 226). The egress policy can include enforcing a specific VLAN or VPN identifier, or other policy index via a policy dissemination protocol. Egress node 114 removes the property vector from the message (operation 228) and forwards the message out of the trust domain (operation 230).

FIG. 2B illustrates exemplary communication 250 between an ingress node 102, an intermediate node 108, and an egress node 114 within a trust domain, in accordance with an embodiment of the present invention. The first several operations 202, 204, 206, 208, 210, 212, and 214 are the same as described in relation to FIG. 2A. Intermediate node 108, upon authenticating the message (operation 214) and determining that its generated authenticator ($AUTH_2$) matches the received authenticator ($AUTH_1$), can modify the property vector (operation 216) and create an additional property vector (operation 218). Intermediate node 108 can perform either or both of these operations. Intermediate node 108 then generates an authenticator (denoted as $AUTH_3$) for the message based on the shared secret key and the modified property vector (operation 220) and forwards the message, the modified property vector, and $AUTH_3$ to egress node 114 (operation 222).

Egress node 114 receives the message, the modified property vector, and $AUTH_3$. As discussed above in relation to FIG. 1, egress node 114 generates an authenticator, authenticates the message, and executes any egress policies included in the property vector (operation 226). Egress node 114 removes the property vector from the message (operation 228) and forwards the message out of the trust domain (operation 230).

Ingress Node Operation

Figure 3:
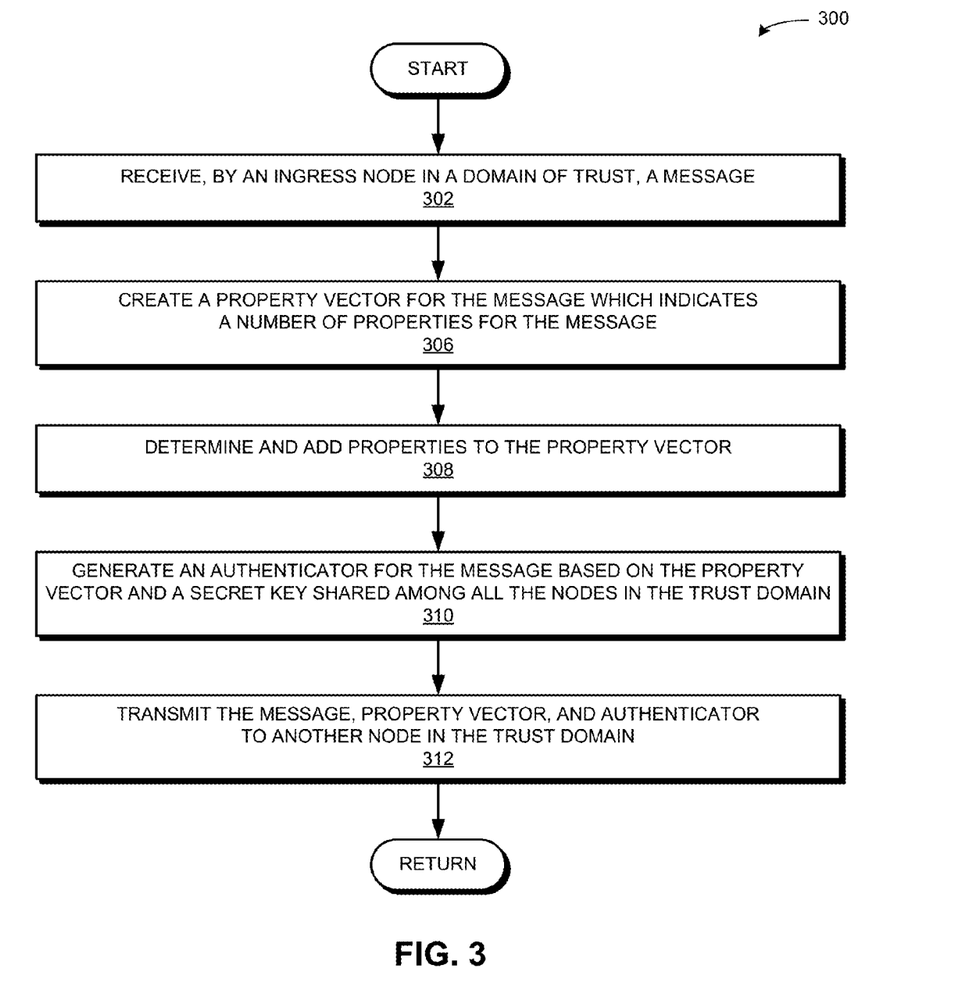
FIG. 3 presents a flow chart illustrating a method, by an ingress node, for receiving, validating, and transmitting a message within a trust domain, in accordance with an embodiment of the present invention.

FIG. 3 presents a flow chart 300 illustrating a method, by an ingress node, for receiving, validating, and transmitting a message within a trust domain, in accordance with an embodiment of the present invention. The system receives, by an ingress node in a trust domain, a message (operation 302). The ingress node creates a property vector for the message, where the property vector indicates a number of properties for the message (operation 306). The ingress node determines various properties and adds them to the property vector (operation 308). These validated properties can include verification of the digital signature of the sender, a hash value of the content object, a similarity hash value of the name and one or more fields of an interest, and verification of various properties such as scheduling priorities, egress policies, billing, auditing, quality of service, and path switching labels. The ingress node then generates an authenticator for the message based on the property vector and a secret key shared among all the nodes in the trust domain (operation 310). The ingress node transmits the message, property vector, and authenticator to another node in the trust domain, based on appropriate routing information (operation 312).

Intermediate Node Operation

Figure 4A:
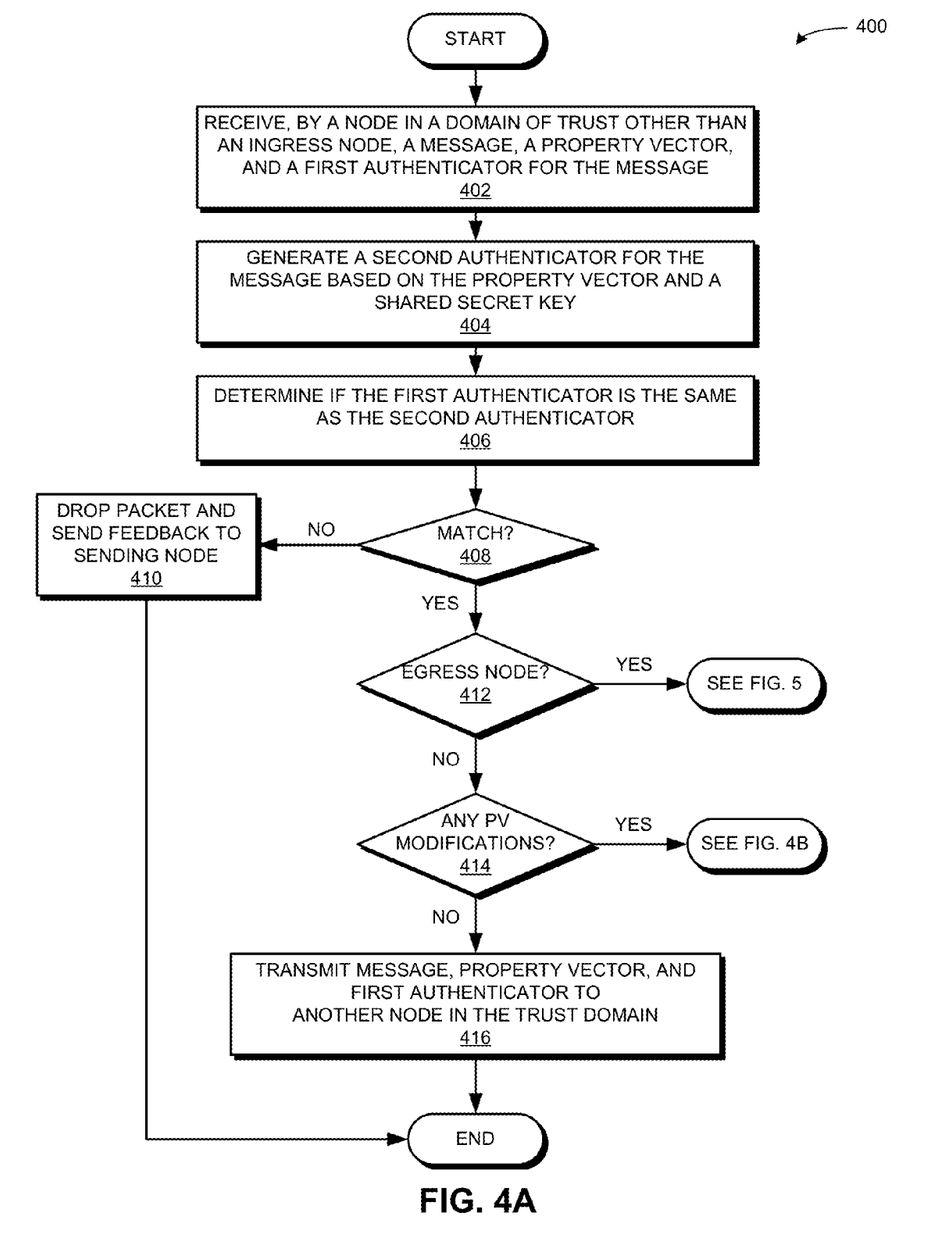
FIG. 4A presents a flow chart illustrating a method, by an intermediate node, for receiving, authenticating, and transmitting a message within a trust domain, in accordance with an embodiment of the present invention.

FIG. 4A presents a flow chart 400 illustrating a method, by an intermediate node, for receiving, authenticating, and transmitting a message within a trust domain, in accordance with an embodiment of the present invention. The system receives, by a node in a trust domain other than an ingress node (such as an intermediate node), a message, a property vector, and a first authenticator for the message (operation 402). The intermediate node generates its own authenticator (the "second authenticator") for the message based on the property vector and a shared secret key (operation 404). Subsequently, the intermediate node determines whether the received authenticator (first authenticator) is the same as its own generated authenticator (second authenticator). If there is not a match (decision 408), then the intermediate node drops the packet and sends feedback to the sending node (operation 410). If there is a match (decision 408) and the node is an egress node (decision 412), the operation continues as described below in relation to FIG. 5. If there is a match (decision 408), the node is not an egress node (decision 412), and the intermediate node makes any modifications or additions to the property vector (decision 414), the operation continues as described below in relation to FIG. 4B. If there is a match (decision 408), the node is not an egress node (decision 412), and the intermediate node does not make any modifications or additions to the property vector (decision 414), the intermediate node transmits the message, property vector, and first authenticator to another node in the trust domain based on appropriate routing information (operation 416). In some embodiments, the intermediate node transmits the second authenticator instead of the first authenticator. Note that by the time operation 416 is performed, the two authenticators have been determined to be the same, so either one can be forwarded.

Figure 4B:
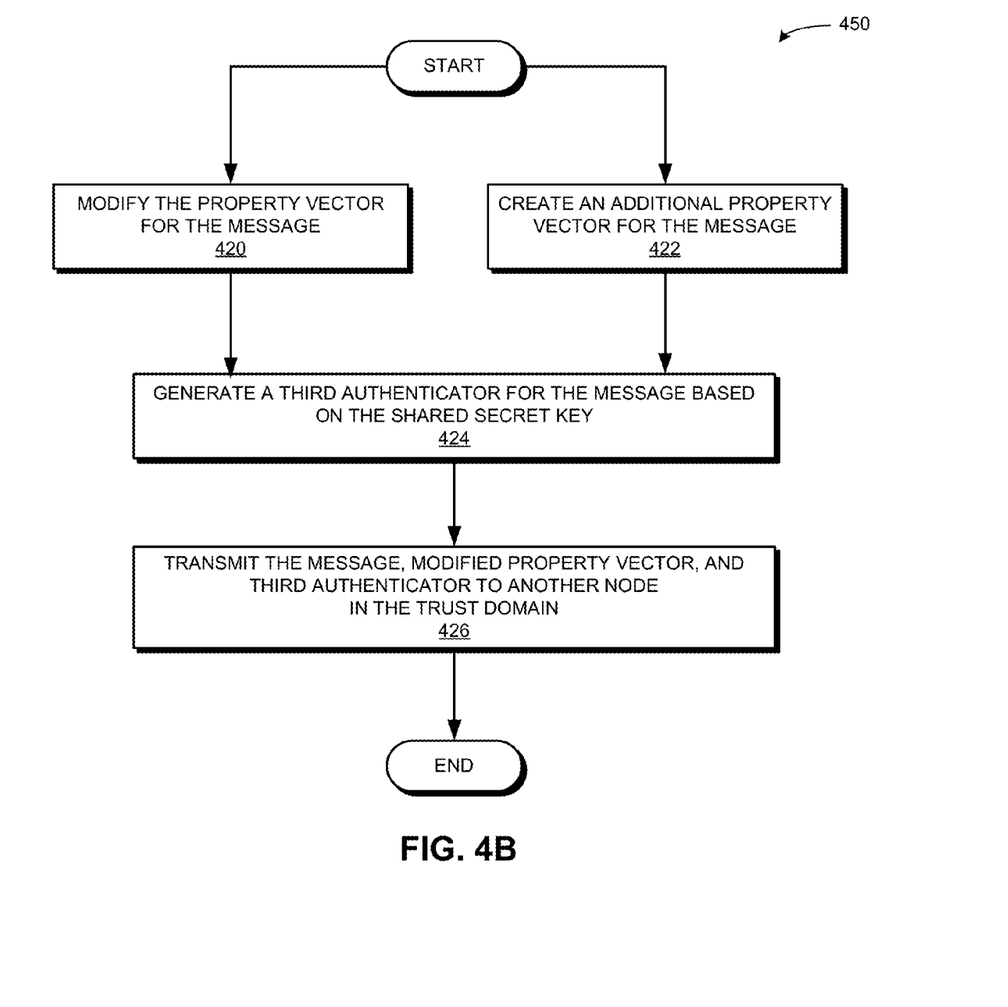
FIG. 4B presents a flow chart illustrating a method, by an intermediate node, for modifying a property vector or creating an additional property vector that corresponds to a message within a trust domain, in accordance with an embodiment of the present invention.

FIG. 4B presents a flow chart 450 illustrating a method, by an intermediate node, for modifying a property vector or creating an additional property vector that corresponds to a message within a trust domain, in accordance with an embodiment of the present invention. Upon authenticating the message by determining that the first authenticator is the same as the second authenticator (decision 408 in FIG. 4A), an intermediate node can perform one or both of the following: modify the property vector for the message (operation 420); and create an additional property vector for the message (operation 422). The intermediate node then generates an authenticator (the "third authenticator") for the message based on the property vector and the shared secret key (operation 424). The intermediate node then transmits the message, modified property vector, and third authenticator to another node in the trust domain based on appropriate routing information (operation 426).

Egress Node Operation

Figure 5:
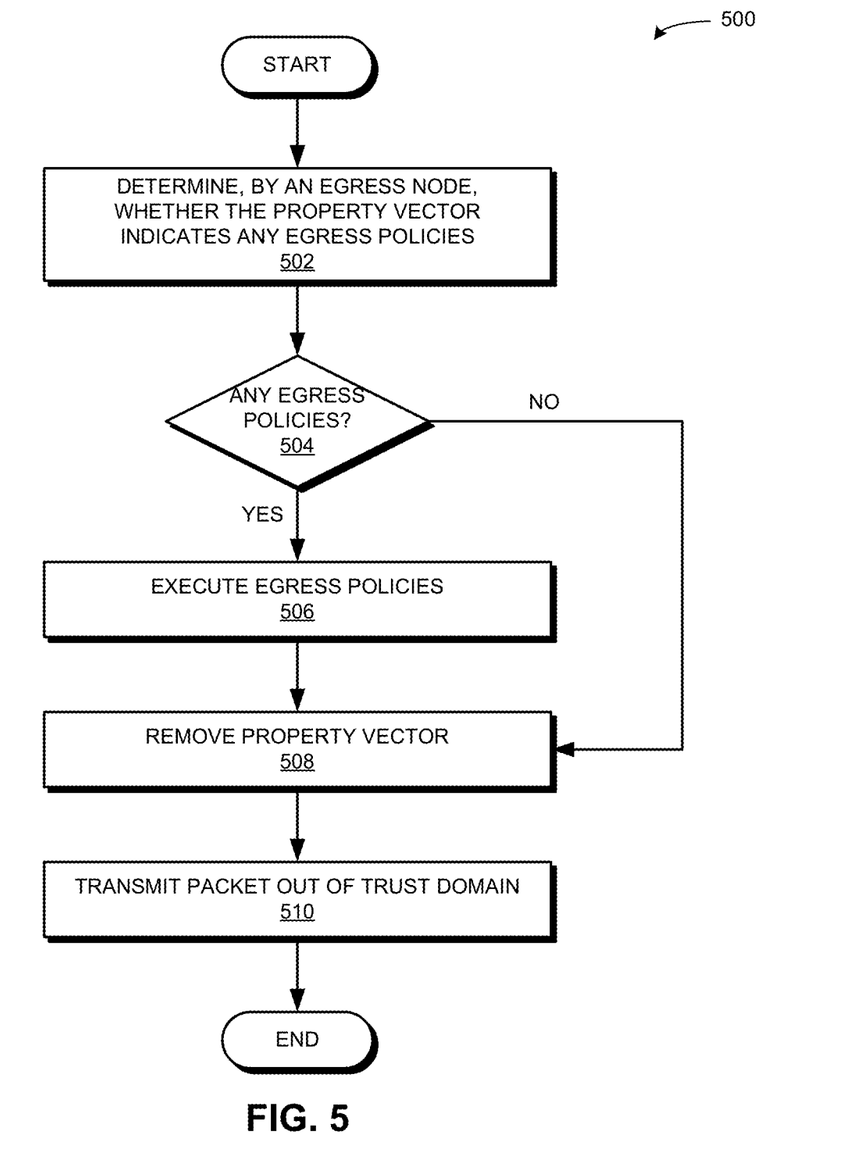
FIG. 5 presents a flow chart illustrating a method, by an egress node, for performing egress procedures on a message within a trust domain, in accordance with an embodiment of the present invention.

FIG. 5 presents a flow chart 500 illustrating a method, by an egress node, for performing egress procedures on a message within a trust domain, in accordance with an embodiment of the present invention. Upon authenticating the message by determining that the first authenticator is the same as the second authenticator (decision 408 in FIG. 4A), and upon determining that the receiving node is an egress node (decision 412 in FIG. 4A), the system determines, by an egress node in the trust domain, whether any egress policies are specified in the property vector (operation 502). If the property vector indicates any egress policies (decision 504), then the egress node executes the specified egress policies (operation 506) and removes the property vector from the message (operation 508). If the property vector does not indicate any egress policies (decision 504), then the egress node removes the property vector from the message (operation 508). The egress node then transmits the packet out of the trust domain (operation 510). Note that even if the egress node does not remove the property vector from the message, a node that receives the message will be outside the trust domain and would thus not trust any authentication performed by the nodes inside the trust domain, and would simply ignore the property vector and authenticator information included in the packet.

Exemplary Format of Packets and Property Vectors

Figure 6A:
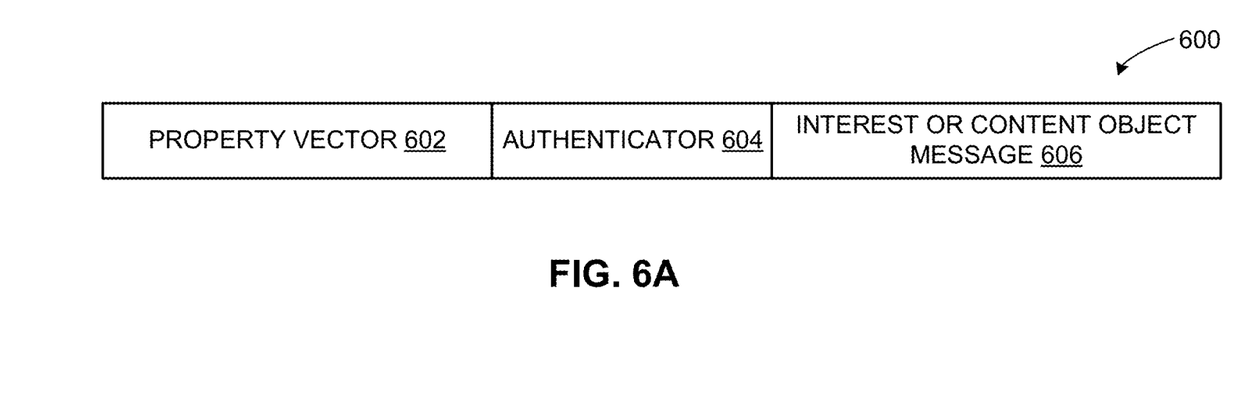
FIG. 6A presents an exemplary format for a packet, within a trust domain, that corresponds to an interest or a content object message, in accordance with an embodiment of the present invention.

FIG. 6A presents an exemplary format for a packet 600, within a trust domain, that corresponds to an interest or a content object message, in accordance with an embodiment of the present invention. Packet 600 can include a property vector 602, an authenticator 604, and an interest or content object message 606. Property vector 602 is created by an ingress node upon the entry of packet 600 into a trust domain and can be later modified by an intermediate node as it travels through the trust domain. Property vector 602 can not only be modified, but a new property vector can be appended to property vector 602 by an intermediate node, as described above in relation to FIG. 4B. Furthermore, authenticator 604 is initially created by an ingress node upon the entry of packet 600 into the trust domain. Because authenticator 604 is based on a shared secret key and, in some embodiments, a hash value of property vector 602, authenticator 604 can also be modified or updated by an intermediate node if any changes are made to property vector 602.

Figure 6B:
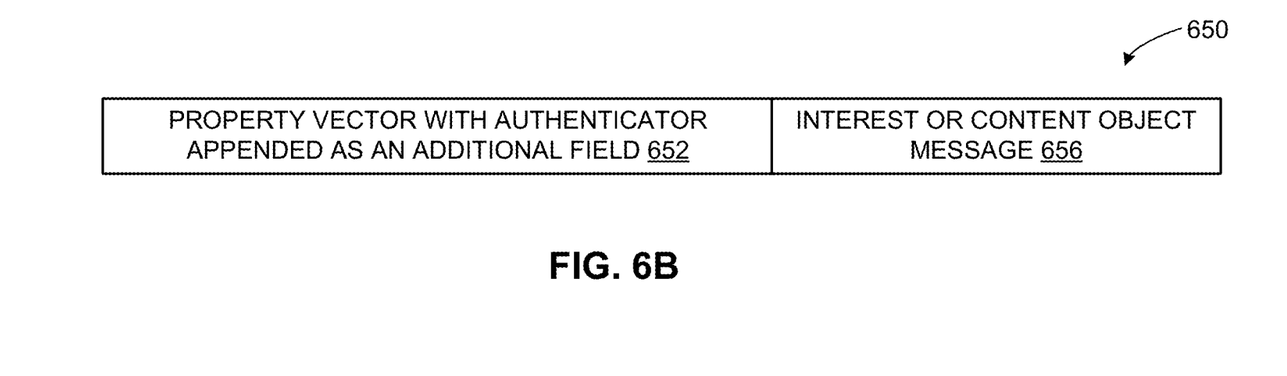
FIG. 6B presents an exemplary format for a packet, within a trust domain, that corresponds to an interest or a content object message, where the authenticator is included in the property vector, in accordance with an embodiment of the present invention.

FIG. 6B presents an exemplary format for a packet 650, within a trust domain, that corresponds to an interest or a content object message, where the authenticator is included in the property vector, in accordance with an embodiment of the present invention. Packet 650 includes an interest or content object message 656 and a property vector with authenticator appended as an additional field 652. Packet 650 shows an alternative format for packet 600, where authenticator 604 of packet 600 is included as an entry in the property vector itself (vector 652).

Figure 7A:
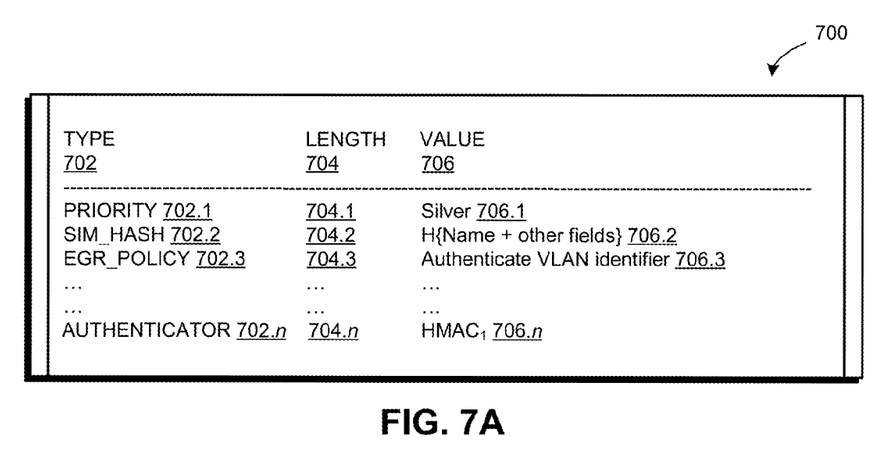
FIG. 7A presents an exemplary format for a property vector that corresponds to an interest in a piece of content, in accordance with an embodiment of the present invention.

FIG. 7A presents an exemplary format for a property vector 700 that corresponds to an interest in a piece of content, in accordance with an embodiment of the present invention. In some embodiments, property vector 700 can be a single serialized vector comprised of a set of Type Length Value (TLV) fields. Each entry in the property vector represents a validated property. Property vector 700 can include a type 702 field which includes values 702.1-702.$n$, a length 704 field which includes values 704.1-704.$n$, and a value 706 field which includes values 706.1-706.$n$. For example, property vector 700 can include the following entries: 1) an entry of type priority 702.1 with a length 704.1 and a value 706.1 of "Silver"; 2) an entry of type sim_hash 702.2 with a length 704.2 and a value 706.2 of H{ . . . } which is the hash value of the name and one or more other fields of the interest; 3) an entry of type egr_policy 702.3 with a length 704.3 and a value 706.3 of "Authenticate VLAN identifier"; and 4) an entry of type authenticator 702.$n$ with a length 704.$n$ and a value 706.$n$ of "$HMAC_1$".

Figure 7B:
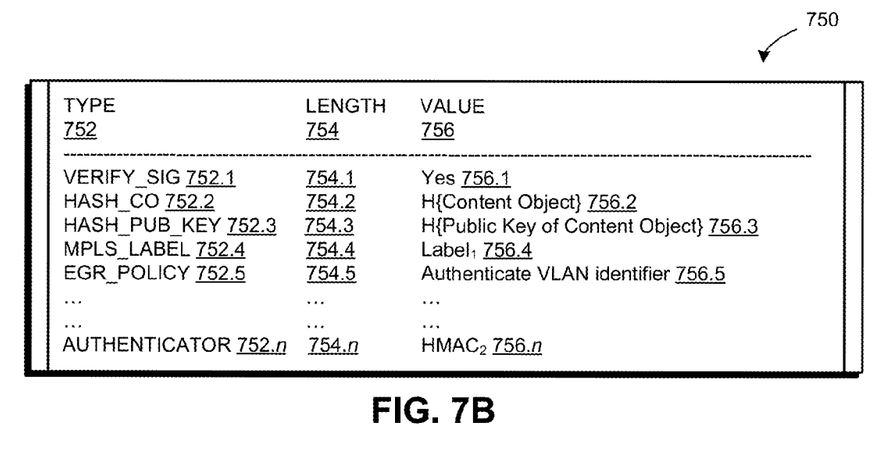
FIG. 7B presents an exemplary format for a property vector that corresponds to a content object, in accordance with an embodiment of the present invention.

FIG. 7B presents an exemplary format for a property vector 750 that corresponds to a content object, in accordance with an embodiment of the present invention. In some embodiments, property vector 750 can be a single serialized vector comprised of a set of TLV fields. Each entry in the property vector represents a validated property. Property vector 750 can include a type 752 field which includes values 752.1-

752.$n$, a length 754 field which includes values 754.1-754.$n$, and a value 756 field which includes values 756.1-756.$n$. For example, property vector 750 can include the following entries: 1) an entry of type verify_sig 752.1 with a length 754.1 and a value 756.1 of "Yes", indicating that the digital signature of the sender has been properly verified; 2) an entry of type hash_CO 752.2 with a length 754.2 and a value 756.2 of H{ ... } which is the hash value of the content object; 3) an entry of type hash_pub_key 752.3 with a length 754.3 and a value 756.3 of H{ ... } which is the hash value of the public key of the content object embedded in the message; 4) an entry of type MPLS_label 752.4 with a length 754.4 and a value 756.4 of "Label$_1$" which is the assigned label on which packet-forwarding decisions are solely made; 5) an entry of type egr_policy 752.5 with a length 754.5 and a value 756.5 of "Authenticate VLAN identifier"; and 6) an entry of type authenticator 752.$n$ with a length 754.$n$ and a value 756.$n$ of "HMAC$_2$".

Note that exemplary property vectors 700 and 750 in FIGS. 7A and 7B, respectively, can also include entries representing various properties relating to state, including information relating to message scheduling priorities, billing, auditing, and quality of service. Property vectors 700 and 750 can also include properties relating to a secure network, including, as determined by an ingress device, that a specific message should follow a well-known switched path, such as in Multi-Protocol Label Switching (MPLS) as shown in the entry with a value 756.4 of "Label$_1$," in FIG. 7B. Furthermore, property vectors 700 and 750 can include other properties not explicitly mentioned herein which indicate validation by border routers of various properties relating to a message or packet received by an ingress node in a trust domain.

Exemplary Computer and Communication System

Figure 8:
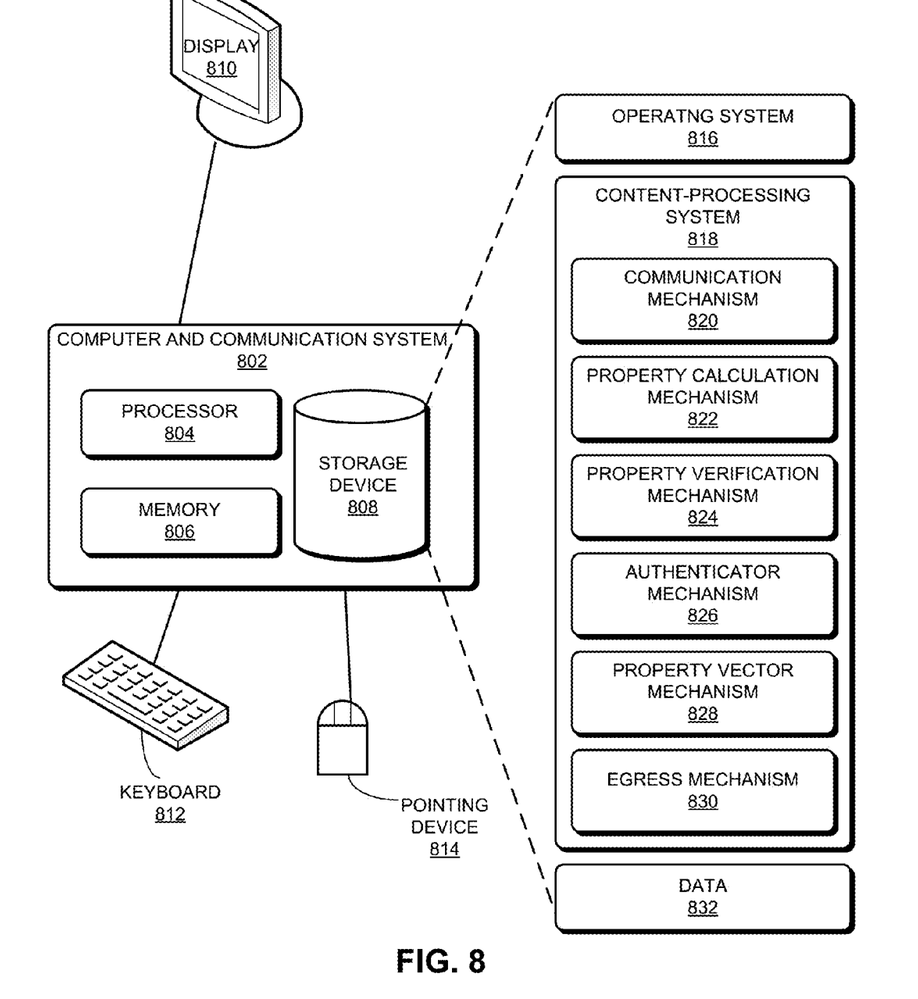
FIG. 8 illustrates an exemplary computer and communication system that facilitates distribution of packets within a trust domain by using property validation at the border routers, in accordance with an embodiment of the present invention.

FIG. 8 illustrates an exemplary computer and communication system 802 that facilitates distribution of packets within a trust domain by using property validation at the border routers, in accordance with an embodiment of the present invention. Computer and communication system 802 includes a processor 804, a memory 806, and a storage device 808. Memory 806 can include a volatile memory (e.g., RAM) that serves as a managed memory, and can be used to store one or more memory pools. Furthermore, computer and communication system 802 can be coupled to a display device 810, a keyboard 812, and a pointing device 814. Storage device 808 can store an operating system 816, a content-processing system 818, and data 832.

Content-processing system 818 can include instructions, which when executed by computer and communication system 802, can cause computer and communication system 802 to perform methods and/or processes described in this disclosure. Specifically, content-processing system 818 may include instructions for receiving a message by an ingress node in a domain of trust (communication mechanism 820). Content-processing system 818 can include instructions for creating a property vector for the message, where the property vector indicates a number of properties that have been determined for the message (property vector mechanism 828). Content-processing system 818 can also include instructions for transmitting and receiving the message, the property vector, and an authenticator (communication mechanism 820). Content-processing system 818 can also include instructions for verifying the digital signature of the sender of a message based on a public key of the sender (property calculation mechanism 822). Content-processing system 818 can include instructions for generating an authenticator for the message based on the property vector and a shared secret key (authenticator mechanism 826).

Content-processing system 818 can further include instructions for creating a property vector for the message, where the property vector indicates a number of properties for the message, and where the property vector corresponds to an interest or a content object (property vector mechanism 828). Content-processing system 818 can include instructions for calculating a similarity hash value of the interest based on the name of the interest and one or more fields of the interest, calculating a hash value of the content object, and calculating a hash value of a public key associated with the content object (property calculation mechanism 822). Content-processing system 818 can also include instructions for verifying information relating to a scheduling priority of the message, a path switching label, billing, quality of service, and auditing (property verification mechanism 824).

Content-processing system 818 can also include instructions for indicating an egress policy in the property vector, which specifies operations to perform upon departure of the message from the trust domain (egress mechanism 830). Content-processing system 818 can include instructions for removing, by an egress node, the property vector associated with the message upon departure of the message from the trust domain (egress mechanism 830).

Content-processing system 818 can further include instructions for determining whether a first authenticator is the same as a second authenticator (authenticator mechanism 826). Content-processing system 818 can also include instructions for modifying the property vector for the message and for creating an additional property vector for the message (property vector mechanism 828), and for generating an authenticator for the message based on the shared secret key and the modified and/or newly created property vector (authenticator mechanism 826). Content-processing system 818 can include instructions for transmitting the message, the modified and/or newly created property vector, and the appropriate authenticator (communication mechanism 820).

Data 832 can include any data that is required as input or that is generated as output by the methods and/or processes described in this disclosure. Specifically, data 832 can store at least: a message that corresponds to an interest in a piece of content; a message that corresponds to a content object; a digital signature of a sender of a message that is based on a private key of the sender; a public key of the sender; a property vector that indicates a number of properties for the message; a shared secret key; an authenticator based on the shared secret key and the property vector; a similarity hash value of the interest based on a name of the interest and one or more fields of the interest; a hash value of the content object; a hash value of a public key associated with the content object; a public key certificate; a scheduling priority of the message; information relating to billing, auditing, or quality of service for the message; a path switching label; and an egress policy.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for distributing packets, the method comprising:
    receiving, by an ingress node in a content-centric network (CCN) trust domain, a message associated with a name that is a hierarchically structured variable-length identifier comprising contiguous name components ordered from a most general level to a most specific level;
    verifying a property of the received message;
    creating a property vector for the message, which includes adding a vector entry indicating that the property of the received message has been verified;
    generating a first authenticator for the message based on the property vector and a secret key shared by a plurality of nodes in the trust domain; and
    transmitting the message, the property vector, and the first authenticator to another node in the trust domain,
    thereby facilitating secure and efficient distribution of messages within the trust domain without requiring intermediate nodes to determine the property indicated in the property vector.

2. The method of claim 1, wherein the message is an interest in a piece of content, and wherein the property vector includes a similarity hash value of the interest based on a name of the interest and one or more fields of the interest.

3. The method of claim 1, wherein the message is a content object, and wherein the property vector includes one or more of:
    a hash value of the content object;
    a hash value of a public key associated with the content object; and
    an indication of whether a digital signature of a sender of the message has been verified.

4. The method of claim 1, wherein the property vector indicates one or more of:
    a scheduling priority of the message;
    information related to billing;
    information related to quality of service;
    information relating to auditing; and
    a path-switching label.

5. The method of claim 1, wherein the property vector further comprises an egress policy of the message, which specifies operations to perform upon departure of the message from the trust domain.

6. The method of claim 1, further comprising:
    removing, by an egress node in the trust domain, the property vector associated with the message upon departure of the message from the trust domain.

7. The method of claim 1, further comprising:
    receiving, by a node in the trust domain other than the ingress node, the message, the property vector, and the first authenticator for the message;
    generating a second authenticator for the message based on the shared secret key and the property vector; and
    responsive to determining that the first authenticator is the same as the second authenticator, authenticating the message.

8. The method of claim 7, further comprising:
    one or more of:
        modifying the property vector for the message; and
        creating an additional property vector for the message;
    generating a third authenticator for the message based on the shared secret key and one or more of the modified property vector and the additional property vector; and
    forwarding the message, one or more of the modified property vector and the additional property vector, and the third authenticator to another node in the trust domain.

9. A computer system for facilitating distribution of packets, the system comprising:
    a processor; and
    a storage device storing instructions that when executed by the processor cause the processor to perform a method, the method comprising:
        receiving, by an ingress node in a content-centric network (CCN) trust domain, a message associated with a name that is a hierarchically structured variable-length identifier comprising contiguous name components ordered from a most general level to a most specific level;
        verifying a property of the received message;
        creating a property vector for the message, which includes adding a vector entry indicating that the property of the received message has been verified;
        generating a first authenticator for the message based on the property vector and a secret key shared by a plurality of nodes in the trust domain; and
        transmitting the message, the property vector, and the first authenticator to another node in the trust domain,
        thereby facilitating secure and efficient distribution of messages within the trust domain without requiring intermediate nodes to determine the property indicated in the property vector.

10. The computer system of claim 9, wherein the message is an interest in a piece of content, and wherein the property vector includes a similarity hash value of the interest based on a name of the interest and one or more fields of the interest.

11. The computer system of claim 9, wherein the message is a content object, and wherein the property vector includes one or more of:
    a hash value of the content object;
    a hash value of a public key associated with the content object; and
    an indication of whether a digital signature of a sender of the message has been verified.

12. The computer system of claim 9, wherein the property vector indicates one or more of:
    a scheduling priority of the message;
    information related to billing;
    information related to quality of service;
    information relating to auditing; and
    a path-switching label.

13. The computer system of claim 9, wherein the property vector further comprises an egress policy of the message, which specifies operations to perform upon departure of the message from the trust domain.

14. The computer system of claim 9, wherein the method further comprises:
removing, by an egress node in the trust domain, the property vector associated with the message upon departure of the message from the trust domain.

15. The computer system of claim 9, wherein the method further comprises:
receiving, by a node in the trust domain other than the ingress node, the message, the property vector, and the first authenticator for the message;
generating a second authenticator for the message based on the shared secret key and the property vector; and
responsive to determining that the first authenticator is the same as the second authenticator, authenticating the message.

16. The computer system of claim 15, wherein the method further comprises:
one or more of:
modifying the property vector for the message; and
creating an additional property vector for the message;
generating a third authenticator for the message based on the shared secret key and one or more of the modified property vector and the additional property vector; and
forwarding the message, one or more of the modified property vector and the additional property vector, and the third authenticator to another node in the trust domain.

17. A non-transitory computer-readable storage medium storing instructions that when executed by a computer cause the computer to perform a method, the method comprising:
receiving, by an ingress node in a content-centric network (CCN) trust domain, a message associated with a name that is a hierarchically structured variable-length identifier comprising contiguous name components ordered from a most general level to a most specific level;
verifying a property of the received message;
creating a property vector for the message, which includes adding a vector entry indicating that the property of the received message has been verified;
generating a first authenticator for the message based on the property vector and a secret key shared by a plurality of nodes in the trust domain; and
transmitting the message, the property vector, and the first authenticator to another node in the trust domain,
thereby facilitating secure and efficient distribution of messages within the trust domain without requiring intermediate nodes to determine the property indicated in the property vector.

18. The storage medium of claim 17, wherein the message is an interest in a piece of content, and wherein the property vector includes a similarity hash value of the interest based on a name of the interest and one or more fields of the interest.

19. The storage medium of claim 17, wherein the message is a content object, and wherein the property vector includes one or more of:
a hash value of the content object;
a hash value of a public key associated with the content object; and
an indication of whether a digital signature of a sender of the message has been verified.

20. The storage medium of claim 17, wherein the property vector indicates one or more of:
a scheduling priority of the message;
information related to billing;
information related to quality of service;
information relating to auditing; and
a path-switching label.

21. The storage medium of claim 17, wherein the property vector further comprises an egress policy of the message, which specifies operations to perform upon departure of the message from the trust domain.

22. The storage medium of claim 17, wherein the method further comprises:
removing, by an egress node in the trust domain, the property vector associated with the message upon departure of the message from the trust domain.

23. The storage medium of claim 17, further comprising:
receiving, by a node in the trust domain other than the ingress node, the message, the property vector, and the first authenticator for the message;
generating a second authenticator for the message based on the shared secret key and the property vector; and
responsive to determining that the first authenticator is the same as the second authenticator, authenticating the message.

24. The storage medium of claim 23, further comprising:
one or more of:
modifying the property vector for the message; and
creating an additional property vector for the message;
generating a third authenticator for the message based on the shared secret key and one or more of the modified property vector and the additional property vector; and
forwarding the message, one or more of the modified property vector and the additional property vector, and the third authenticator to another node in the trust domain.

* * * * *